United States Patent Office 3,315,757
Patented Apr. 25, 1967

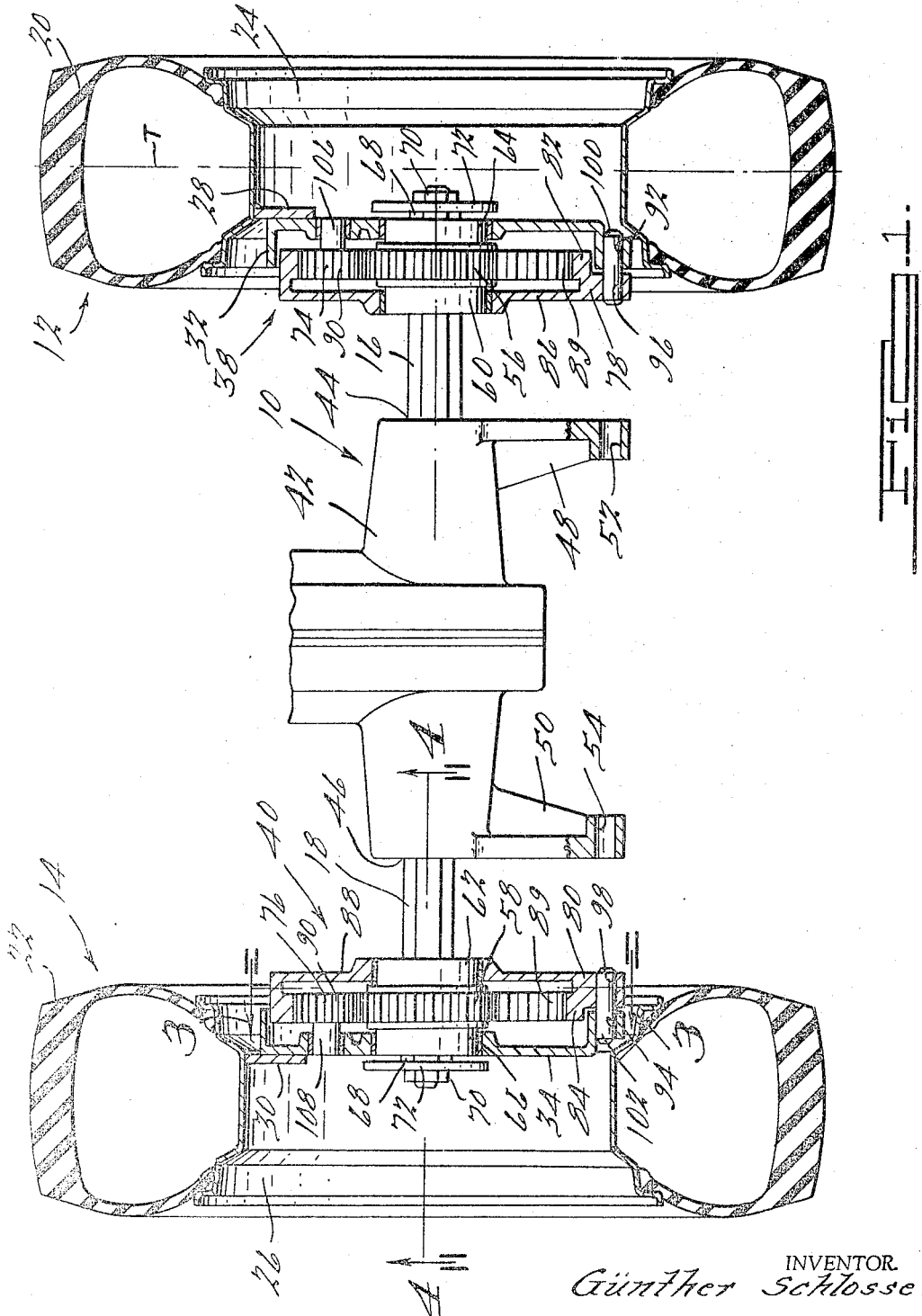

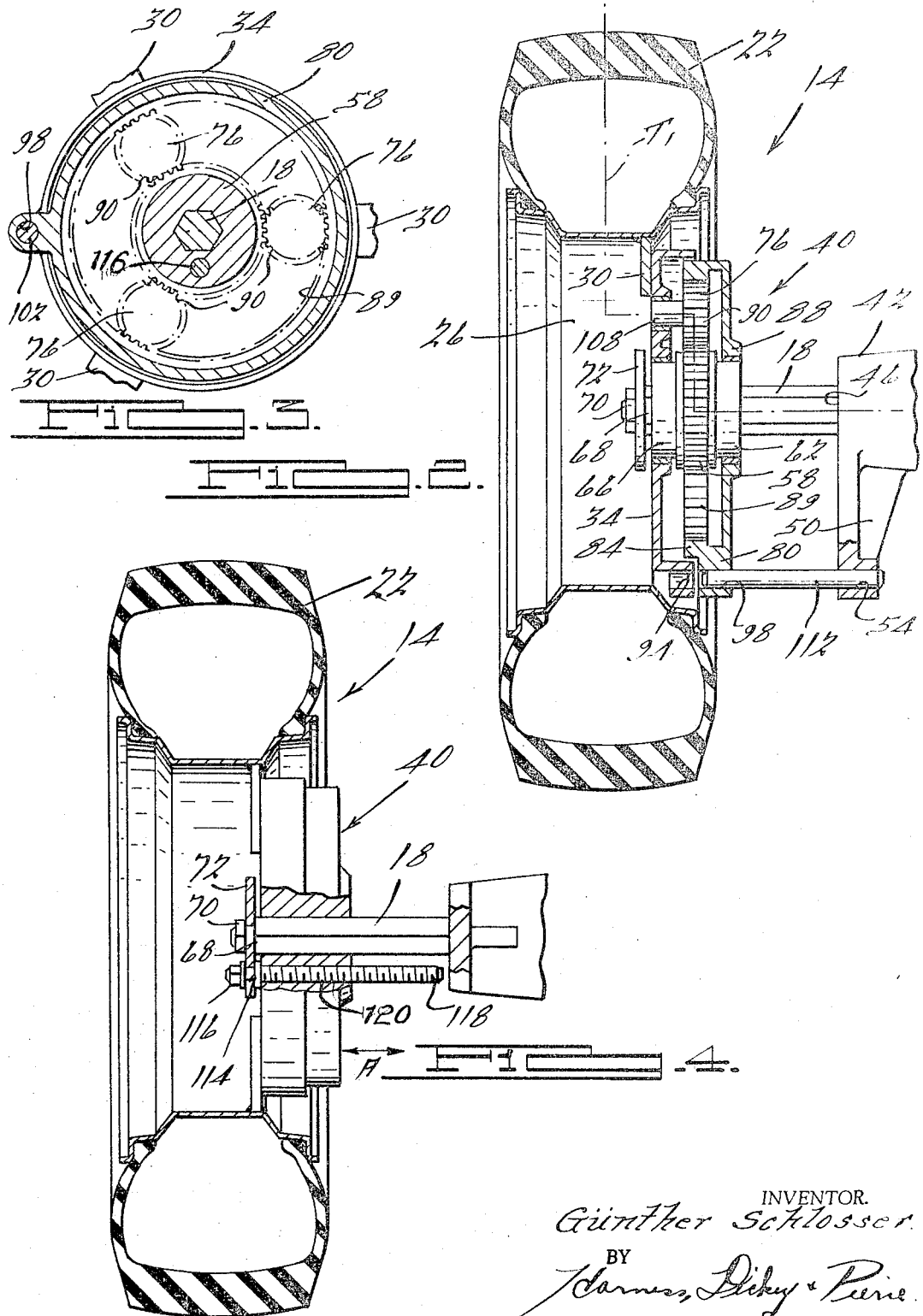

3,315,757
VARIABLE SPEED DRIVE FOR ADJUSTABLE GAGE AXLES
Günther Schlosser, Bubingen (Saar), Germany, assignor to Walter Gutbrod and Wolfgang Gutbrod, Bubingen (Saar), Germany
Filed July 9, 1964, Ser. No. 381,349
Claims priority, application Germany, July 10, 1963, G 38,141
4 Claims. (Cl. 180—75)

This invention relates generally to a drive mechanism for land vehicles and more particularly to a drive mechanism for agricultural implements having means thereon which is adapted to change the drive characteristics of the vehicle.

Agricultural implements such as tractors and the like which are in use for certain applications on farms and other like agricultural areas are required to have certain specific drive characteristics due to the specific nature of the tasks to be accomplished. For example, in many instances an extremely low speed of travel is greatly desired and often required. Tests have shown that the ideal speed is of the order of .5 kilometer per hour or .31 mile per hour to achieve the desired results. Also, it is desirable that the machine have a capability of developing high torques to perform the various operations on the heavy and cumbersome loads usually found on farms and the like.

The development of a high torque capability normally requires that the engine operate at high speeds or revolutions per minute as is common in engines of the type used on farms, a situation which increases the problem of an ability to operate at speeds of the order mentioned above. Thus, the transmissions required must be able to reduce the speed of the wheels relative to the engine and still be of sufficient strength to handle the great torques involved. The ideal situation is where the torque capability of a machine is limited solely by its own weight.

Certain prior art devices have supplied the art with machines which have great torque producing capabilities, and, while the one problem is solved, the transmission or drive becomes heavy, cumbersome and expensive. The solution of the torque problem has left the agricultural art with a commercial vehicle which has a lowest speed limitation of approximately three-quarters of one mile per hour, substantially exceeding the desired operating speed for many applications.

Further situations encountered in certain farm applications require that the machine have certain contrivances thereon which enable the user to adjust the wheel track or vary the spacing between the drive wheels to adapt the vehicle to various plant row widths. The various varieties of plants normally found on a farm have a specified row spacing and one farm machine must be adapted to be used in operating on the many varieties of plants while still maintaining the low rate of speed described above. Certain prior art vehicles which have incorporated this variable track width have been required to sacrifice a portion of the low speed range thus making the vehicle unsuitable for certain applications.

The agricultural machine of the present invention is calculated to substantially alleviate the aforementioned problems through the use of a unique drive system not heretofore available to the art. Certain features of the invention contemplate the provision of a reduction gearing system, preferably of the planetary type, incorporated into the drive chain to the driven wheels which are selectively engageable to provide the optimum low speeds described above.

Certain other features of the invention contemplate providing a reduction gear assembly which is capable of being incorporated as a unitary structure into the hub section of the driven wheels to enable the invention to be applied to units having an adjustable track feature and to allow the invention to be applied to existing tractors. This feature also allows the reduction unit to be compactly applied to the machine. In applying the invention to existing units, it is seen that little or no modification of the existing machine is required and the wheel and reduction gearing assembly is merely applied to the existing axle of the machine.

One object of the present invention is to provide an improved agricultural implement.

Another object of the present invention is to provide an agricultural implement having improved drive characteristics.

Another object of the present invention is to provide a reduction gear assembly which is easily connected into one mode of operation or disconnected into another mode of operation.

Still another object of the present invention is to provide a reduction gear assembly which is capable of being applied to agricultural implements having adjustable track features.

Still another object of the present invention is to provide a reduction gear assembly which is capable of being applied to existing farm implements with facility and without substantial modification.

A further object of the present invention is to provide the agricultural implement art with a machine having increased torque producing capabilities.

A further object of the present invention is to provide a reduction gear assembly which is compact in its application to farm implements.

A still further object of the present invention is to provide a reduction gear assembly which is rugged and durable in use.

Still another object of the present invention is to provide a reduction gear assembly that is inexpensive and easy to manufacture.

Still another object of the present invention is to provide a reduction gear assembly which is lightweight and simple in construction.

Other objects, features and advantages of the present invention will become apparent from the subsequent description, taken in conjunction with the accompanying drawing in which:

FIGURE 1 is a front view of the drive assembly of a farm implement illustrating certain principles of the present invention with the reduction gear assembly shown in section and in the locked mode;

FIGURE 2 is a front view of the left end of the drive assembly of FIGURE 1 illustrating the reduction gear assembly in section as it is modified to illustrate the reduction gear assembly in the engaged mode;

FIGURE 3 is a sectional view of the reduction gear assembly as taken along lines 3—3 of FIGURE 1; and FIGURE 4 is a sectional view of the track adjusting mechanism of FIGURE 1 taken along lines 4—4 thereof.

Referring now to the drawings, wherein is illustrated the drive assembly of a farm implement having a differential 10 which serves to furnish power to a set of driven wheels 12 and 14 through a pair of drive axles 16 and 18. The wheel assemblies 12 and 14 are made up in a conventional manner by providing a pair of tires 20 and 22 which have been mounted on a pair of rims 24 and 26. Rims 24 and 26 are provided with a plurality of circumferentially spaced webs 28 and 30 which are adapted to be suitably fastened to a pair of hub plates 32 and 34 as by welding, bolting or the like, and the hub plates 32 and 34 are supported radially spaced from the drive axles 16 and 18 by means of a pair of reduction gear assemblies 38, 40 as will be hereinafter described in detail. The outer periphery of the drive axles 16, 18 may be of any non-circular configuration such as hexagonal, splined or the like.

The differential 10 is of the conventional type normally found in implements of this type and is housed in a casing 42 having a pair of axle openings 44, 46 into which axles 16 and 18 are rotatably journaled and a pair of depending channel members 48, 50 are formed at a lower portion of casing 42. Channel members 48, 50 may be integrally cast with casing 42 and are formed of the materials used for the casing 42 chosen for strength and ability to take shocks. The lower ends of channels 48, 50 are provided with a pair of generally horizontally disposed apertures or pin receiving guides 52, 54 which are for a purpose to be explained hereinafter in conjunction with the description of the gear reduction assemblies 38, 40.

The gear reduction assemblies 38 and 40 will be first described in the locked mode of operation, as illustrated in FIGURE 1. The speed reduction assemblies 38, 40 generally comprise a pair of sun gears 56, 58 which are non-rotatably secured to the drive axles 16, 18 by a bore having a mating configuration to the configuration of the periphery of axles 16, 18. The sun gears 56, 58 are flanked on either side thereof by a pair of inboard bearing members 60, 62 suitably fixed on axles 16, 18 and a pair of outboard bearing members 64, 66. These bearings 60–66 may be pressed or otherwise fixed to axles 16, 18 as are the sun gears.

It is to be understood that these last named members may be fixed in any suitable manner as for example, by providing a shoulder on the inboard side of the axles 16, 18 adjacent the inboard bearings 60, 62 in the situation where the implement is not provided with an adjustable track feature. However, as will be hereinafter explained, if such an adjustability feature is provided, the sun gears 56, 58 and bearings 60–66 must be axially slidably but non-rotatably supported on axles 16, 18. The inboard bearings 60, 62 are then slid on the splined axles 16, 18, followed by the sun gears 56, 58 and the outboard bearings 64, 66. A washer and nut assembly may then be provided to insure that the sun gears will be axially fixed, as for example, the lock nuts 68 and 70 with a pair of washers 72 disposed therebetween. The important consideration in this regard is that the sun gears 56, 58 are non-rotatably fixed.

A set of three planetary gears 74 are disposed at the right side of axle 16 at equal angles around the sun gear 56 in contact with the periphery thereof and a similar configuration of planetary gears 76 is provided at the left end of axle 18. A pair of annular cup shaped retaining members 78, 80 having axially extending flange portions 82, 84 concentrically disposed over said planetary gears 74, 76 and a pair of radially extending plate portions 86, 88 axially inwardly spaced from the gears 56, 74 and 58, 76 respectively. The flange portions 82, 84 are formed with an annular array of radially inwardly facing gear teeth 89 which are adapted to accommodate the peripheral teeth 90 on the planetary gears 74, 76 thus radially retaining the gears 74, 76 in position against sun gears 56, 58. The radial plate portions 86, 88 provide additional rigidity to the structure and also serve to prevent the entry of foreign material into the gear train. A similar purpose is served by the axially extending flanges of hub plates 32, 34. It is to be noted that members 32, 34 and 86, 88 are illustrated as being radially fixed to the bearing members 60–66 and it is for radial support that these bearings have been provided as members 32, 34 and 86, 88 rotate relative to axles 16, 18 in certain modes of operation of the reduction gear assemblies 38, 40.

Each hub member 32, 34 is formed with axially extending apertures 92, 94 which are aligned with another pair of axially extending apertures 96, 98 formed in retaining members 78, 80. A pair of pins 100, 102 are received in both pairs of aligned apertures, as illustrated in FIGURE 1, and serve to lock members 32, 34 to members 78, 80, respectively. Thus the hub members 32, 34 will rotate at the same speed as retaining members 78, 80, respectively, and the speed reducing assembly will be rendered ineffective. While pins 100, 102 may tend to drive the wheel assemblies 12, 14, the planetary gears 74, 76 have been provided with a set of axially extending stub shafts 106, 108 which will also transmit torque from the sun gears 56, 58 to the hub plates 32, 34.

Thus, the locking of the reduction gear assemblies 38, 40 drives the wheel assemblies 12, 14 at the same speed as shafts 16, 18. In this situation where the gear assemblies are locked, the torque transmitted to the wheels may be illustrated by the dash-dot torque line T, and is seen to be transmitted directly without the reduction in speed produced by the gear assemblies 38, 40 when in the alternative mode of operation illustrated in FIGURE 2.

Referring now to FIGURE 2, there is illustrated the left end of the drive assembly of FIGURE 1 wherein the reduction gear assembly is illustrated in the operative mode. The parts of FIGURE 2 which are identical with those of FIGURE 1 have been similarly numbered and it is seen that the gear arrangement is identical. As was stated above, casing 42 is formed with a depending channel 50 having an aperture 54 formed therein. When it is desired to connect the reduction gear assembly 40 in the operative mode, apertures 54 and 98 are axially aligned and a pin 112 is inserted therethrough. In this manner the retaining member 80 is locked to casing 42 and precludes any relative rotation therebetween. Thus, the wheel assembly 14 is driven by sun gear 58 by means of the planetary gears 76 and stub shafts 108, achieving a reduction in speed between axle 18 and tire 12.

The transmission of torque in this mode of operation may be illustrated as being delivered to the wheel assembly 14 from axle 18 along the line T1, which includes axle 18, sun gear 58, planetary gears 76, stub shaft 108, hub plate 34, webs 30 to the rim 26. In this mode it is to be noted that pin 102 has been removed and, while retaining member 80 is fixed to casing 42, hub plate 34 is free to rotate relative to retaining member 80. The rate at which this relative rotation proceeds is directly related to the configuration of the sun gear 58 and planetary gears 76.

Referring to FIGURE 4, there is illustrated an apparatus for adjusting the wheel track of the implement. Regarding the statements above of the manner in which the bearings and sun gears are fixed to the axle, it to be noted that in assemblies wher a wheel track adjustment is provided, the sun gear must be freely axially slidable on the axle. In the illustration of FIGURE 4, which is a section of the left end of FIGURE 1, the same locknut 68, 72 and washer 70 fastener is applied to the end of axle 18 and the outer edge of the washer 72 is provided with an aperture 114 which is adapted to receive the end of a bolt 116 therein. The bolt 116 is carried in aperture 114 in a conventional manner which allows the bolt 116 to be freely rotated therein. The threaded portion 118 of the bolt 116 is threadedly received in a threaded aperture 120 formed in the base of the sun gear and bearing assembly.

Thus, as the bolt 116 is rotated by means of its head portion, the threaded portion 118 drives the sun gear and bearing assemblies inwardly or outwardly in the direction of the arrow A. While the sun gear 58 and bearing assemblies 62, 66 have not been illustrated in detail, it is to be understood that they are identical to those of FIGURES 1 to 3. It is also contemplated that the sun gear 58 and fixed portion of bearing members 62, 66 may be formed as an integral part with the teeth of the sun gear 58 and the inner bearing races of bearings 62, 66 formed at an outer periphery thereof.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. A drive unit for an agricultural implement comprising:
   an axle,
   driving means connected to said axle for providing motive power thereto including a housing having a horizontally extending aperture formed therein radially outwardly spaced from said axle,
   a wheel assembly supported on said axle for rotative movement relative to said housing and adapted to be driven by said axle,
   said wheel assembly including a rim and a hub portion fixedly secured to said rim,
   said hub portion having a plurality of axially extending apertures formed therein radially outwardly spaced from said axle including one aperture radially spaced from said axle at an equal distance to said aperture in said housing and adapted to be axially aligned therewith,
   a reduction gear assembly fixedly secured to one end of said axle and substantially concentrically received within said wheel assembly,
   said reduction gear assembly including a sun gear fixedly secured to said axle,
   an annular cup shaped retaining member concentric with said axle having a flange portion concentric with and radially spaced from said sun gear,
   said flange portion having an aperture formed at one edge thereof and radially spaced from said axle a distance equal to the radial spacing of said aperture in said housing and said one aperture in said hub portion and an array of gear teeth formed at a radially inwardly facing surface thereof,
   a planetary gear disposed between said sun gear and said flange gear teeth and in engagement therewith,
   said planetary gear having a stub shaft axially mounted thereon and received in at least one of said apertures of said hub portion for transmitting torque from said sun gear to said hub portion,
   a first pin adapted to be inserted into both said flange aperture and said one aperture in said hub for locking said wheel assembly to said retaining member against relative rotation therebetween for a first mode of operation of the drive unit, and
   a second pin adapted to be inserted into both said housing aperture and said flange aperture for locking said retaining member against relative rotation therebetween for a second mode of operation of the drive unit.

2. A drive unit for an agricultural implement comprising;
   an axle,
   means drivingly connected to said axle for providing motive power thereto,
   a wheel assembly supported for rotative movement on said axle and adapted to be driven thereby,
   speed reduction means interposed between said axle and said wheel assembly, said speed reduction means being axially fixed with respect to said wheel assembly and contiguous therewith for causing relative rotation between said axle and said wheel assembly and reducing the speed thereof as derived from said axle including
       first gear means non-rotatably supported relative to said axle, and
       second gear means engaging said first gear means and drivingly connected to said wheel assembly for transferring torque from said axle to said wheel assembly,
   said first gear means having an axially extending threaded aperture formed therein radially spaced from said axle,
   flange means axially and non-rotatably fixed to said axle having an aperture formed therein aligned with said gear means aperture, and
   adjusting means rotatably mounted in said flange means and extending axially into threaded engagement with said first gear means aperture whereby rotation of said adjusting means axially adjusts the axial position of said first gear means and thus said wheel assembly relative to said axle.

3. A drive unit for an agricultural implement comprising;
   an axle,
   means drivingly connected to said axle for providing motive power thereto,
   a wheel assembly supported for rotative movement on said axle and adapted to be driven thereby,
   speed reduction means interposed between said axle and said wheel assembly, said speed reduction means being axially fixed with respect to said wheel assembly and contiguous therewith for causing relative rotation between said axle and said wheel assembly and reducing the speed thereof as derived from said axle including
       first gear means non-rotatably supported relative to said axle, and
       second gear means engaging said first gear means and drivingly connected to said wheel assembly for transferring torque from said axle to said wheel assembly,
   said first gear means having an axially extending threaded aperture formed therein radially spaced from said axle,
   washer means axially fixed to one end of said axle having an aperture formed therein aligned with said gear means aperture, and
   an adjusting screw rotatably mounted in said washer aperture and extending axially into threaded engagement with said threaded aperture whereby rotation of said adjusting screw axially adjusts the axial position of said first gear means and thus said wheel assembly relative to said axle.

4. A drive unit for an agricultural implement comprising;
   an axle,
   driving means connected to said axle for providing motive power thereto including a housing having a horizontally extending aperture formed therein radially spaced from said axle,
   a wheel assembly including a hub supported on said axle for rotative movement relative to said housing and adapted to be driven by said axle,
   said hub having an aperture positioned therein radially outwardly spaced from said axle,
   spaced reduction gear means interposed between said axle and said wheel assembly including means adapted to be non-rotatably fixed to either said hub or said housing for causing said hub to rotate at the speed of said axle or at a speed different from the speed of said axle,
   said last named means having an aperture positioned therein radially outwardly spaced from said axle,
   said aperture in said housing, said aperture in said hub, and said aperture in said last named means being equally outwardly spaced from said axle,
   a first pin adapted to be inserted into both said aperture in said hub portion and said aperture in said last named means to thereby non-rotatably fix sid hub to said last named means, and
   a second pin adapted to be inserted into both the aperture in said housing and the aperture in said last named means to thereby non-rotatably fix the housing to said last named means.

(References on following page)

References Cited by the Examiner

UNITED STATES PATENTS

| | | | |
|---|---|---|---|
| 115,343 | 5/1871 | Morse. | |
| 1,464,887 | 8/1923 | Starr. | |
| 2,517,875 | 8/1950 | Henry | 74—801 X |
| 2,829,725 | 4/1958 | Wurdelman | 180—75 |
| 2,885,018 | 5/1959 | Jackson | 180—75 |
| 3,150,532 | 9/1964 | Bixby | 180—43 |
| 3,184,985 | 5/1965 | Dreitzler | 180—75 X |

FOREIGN PATENTS 382,888   5/1921   Germany.

A. HARRY LEVY, *Primary Examiner.*